(12) United States Patent
Yamamoto et al.

(10) Patent No.: US 6,845,842 B2
(45) Date of Patent: Jan. 25, 2005

(54) VIBRATION-PROOFING STRUCTURE FOR HOLLOW PIPE FOR VEHICLE

(75) Inventors: Kazuo Yamamoto, Saitama (JP); Mikimasa Matsubayashi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 9 days.

(21) Appl. No.: 10/302,925

(22) Filed: Nov. 25, 2002

(65) Prior Publication Data

US 2003/0121719 A1 Jul. 3, 2003

(30) Foreign Application Priority Data

Nov. 30, 2001 (JP) ........................................ 2001-365558

(51) Int. Cl.⁷ .............................................. F16F 15/00
(52) U.S. Cl. ........................ 181/209; 181/207; 181/208
(58) Field of Search ................................ 181/209, 207, 181/208

(56) References Cited

FOREIGN PATENT DOCUMENTS

| JP | 07034895 A | * | 7/1993 |
| JP | 2594734 B2 | | 12/1996 |
| JP | 10166825 A | * | 6/1998 |

* cited by examiner

*Primary Examiner*—Shih-yung Hsieh
(74) *Attorney, Agent, or Firm*—Birch, Stewart, Kolasch & Birch, LLP

(57) ABSTRACT

To make it possible to fit a vibration-proofing member into a hollow pipe, without impairing the appearance and without increasing the number of component parts. A hollow pipe formed by extrusion of a light alloy is integrally provided on an inside surface thereof with a rib extending along the longitudinal direction of the hollow pipe. A vibration-proofing member for restraining vibration of the hollow pipe is inserted in the hollow pipe so that the rib holds a position thereof in the hollow pipe in a direction orthogonal to the longitudinal direction.

18 Claims, 7 Drawing Sheets

VIBRATION-PROOFING STRUCTURE FOR HOLLOW PIPE FOR VEHICLE

CROSS-REFERENCE TO RELATED APPLICATIONS

This nonprovisional application claims priority under 35 U.S.C. § 119(a) on Patent Application No. 2001-365558, filed in Japan on Nov. 30, 2001. The entirety of which is hereby incorporated by reference.

BACKGROUND OF THE INVENTION

1. Field of the Invention

The present invention relates to a vibration-proofing structure for a hollow pipe for a vehicle, which is preferably used for a frame member of a vehicle such as a motorcycle. In particular, the present invention relates to an improvement in a vibration-proofing structure for a hollow pipe for a vehicle in which a vibration-proofing member is fitted.

2. Description of Background Art

Japanese Patent No. 2594734 has disclosed a structure in which a vibration-proofing member formed of an elastic material is fitted to the outside or the inside of a hollow pipe. The vibration-proofing member is constituted by connecting a pair of split members between a holding plate fastened to the hollow pipe and the hollow pipe.

According to the above-mentioned conventional structure; however, the appearance of the hollow pipe may be impaired when the vibration-proofing member is fitted to the outside of the hollow pipe. Furthermore, even when the vibration-proofing member is fitted to the inside or the outside of the hollow pipe, other component parts such as the holding plate and screw members are required in addition to the vibration-proofing member. This leads to an increase in the number of component parts.

SUMMARY OF THE INVENTION

The present invention has been made in consideration of the above-mentioned circumstances. Accordingly, it is an object of the present invention to provide a vibration-proofing structure for a hollow pipe for a vehicle in which a vibration-proofing member can be fitted to a hollow pipe while preventing the appearance from being impaired and while obviating an increase in the number of component parts.

In order to attain the above object, according to a first aspect of the present invention, a hollow pipe for vehicle is formed by extrusion of a light alloy. The hollow pipe is integrally provided on an inside surface thereof with a rib extending along a longitudinal direction of the hollow pipe. A vibration-proofing member is included for restraining vibration of the hollow pipe. The vibration-proofing member is inserted in the hollow pipe so that the rib holds a position in the hollow pipe in a direction orthogonal to the longitudinal direction.

According to such a construction, the appearance of the hollow pipe is not impaired because the vibration-proofing member is inserted in the hollow pipe. Furthermore, the number of component parts is not increased because the vibration-proofing member is held in the hollow pipe by the rib, which is integral with the hollow pipe. In addition, the rib extends in the longitudinal direction of the hollow pipe, which is formed by extrusion of a light alloy. Accordingly, the rib can be formed simultaneously with the extrusion of the hollow pipe. Furthermore, the rib does not act as an obstacle at the time of inserting the vibration-proofing member into the hollow pipe.

In addition, according to a second aspect of the present invention, the vibration-proofing member is formed of an elastic material and is provided with a groove for elastic engagement with the rib. According to such a construction, the vibration-proofing member can be held in the hollow pipe more securely while maintaining the position of the vibration-proofing member in the longitudinal direction of the hollow pipe by a frictional force arising from the elastic engagement of the groove with the rib.

According to a third aspect of the present invention, the vibration-proofing member is provided with a plurality of engaging portions for engagement with the rib at intervals along the longitudinal direction of the rib. According to such a construction, a plurality of portions spaced along the longitudinal direction of the vibration-proofing member make sliding contact with the hollow pipe at the time of inserting the vibration-proofing member into the hollow pipe. Accordingly, the frictional resistance at the time of inserting the vibration-proofing member can be suppressed to a comparatively low value. Therefore, the inserting operation can be facilitated.

According to a fourth aspect of the present invention, at least a part of a rear fork of a motorcycle is constructed of the hollow pipe. According to such a construction, the effect of any of the first through third aspects of the present invention can be obtained by constructing a vibration-proofing structure for the rear fork.

Furthermore, according to a fifth aspect of the present invention, at least a part of a main frame of a motorcycle is constructed of the hollow pipe. According to such a construction, the effect of any of the first through third aspects of the present invention can be obtained by constructing the vibration-proofing structure for the main frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings.

Figure 1:
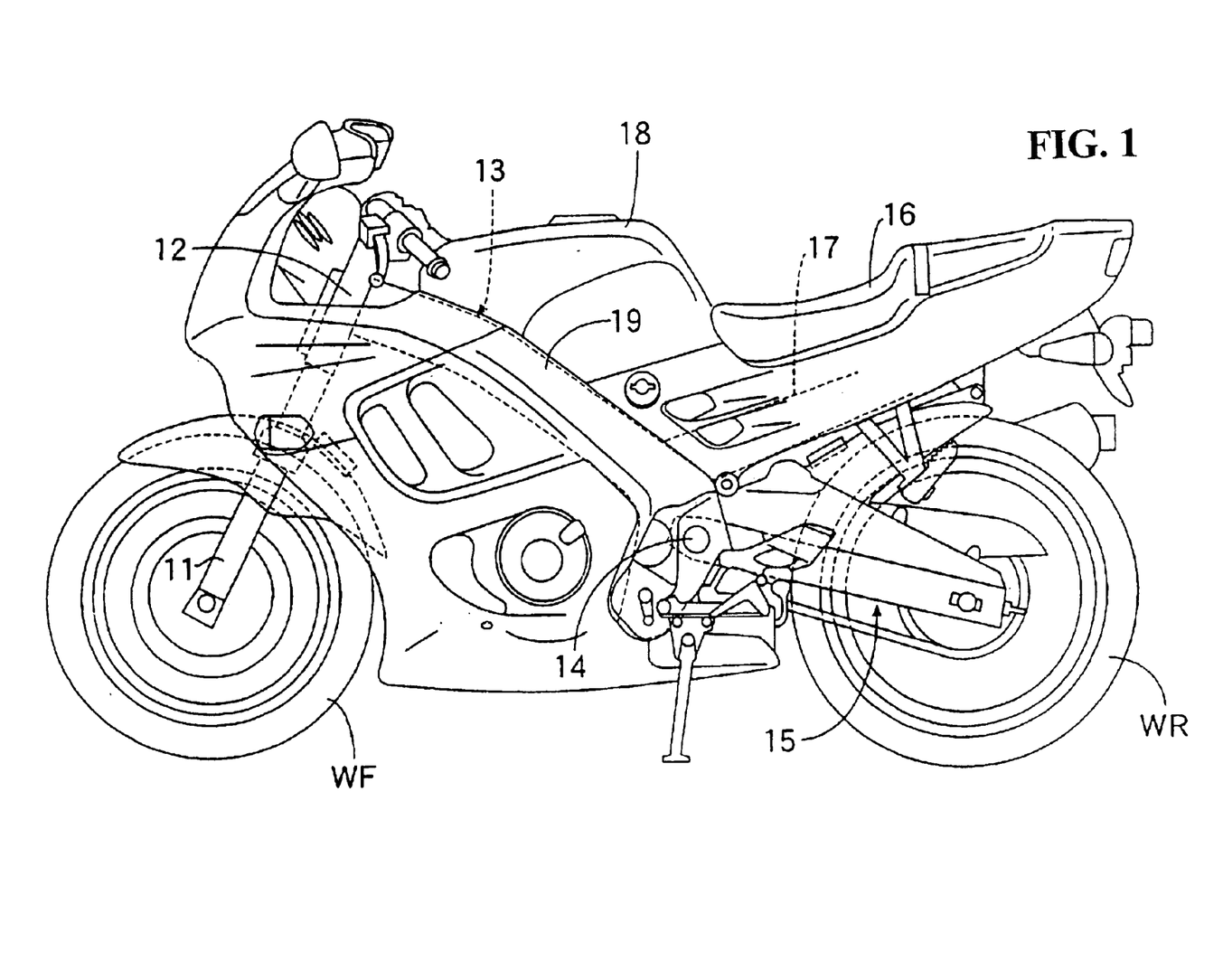
FIG. 1 is a side view of a motorcycle to which the present invention has been applied.

FIGS. 1 to 8 show one embodiment of the present invention. Referring to FIG. 1, the motorcycle includes a front fork 11 for supporting a front wheel WF. A body frame 13 includes a head pipe 12 at a front end thereof for steerably supporting the front fork 11. A rear fork 15 is vertically swingably supported on a rear portion of the body frame 13 through a pivotal shaft 14. The rear fork 15 supports a rear wheel WR. Furthermore, a seat stay 17 extends rearwardly upward from an intermediate portion of the body frame 13. The seat stay 17 supports a seat 16. A fuel tank 18 is mounted on the body frame 13 and a front portion of the seat stay 17. Furthermore, an engine (not shown) is disposed on a lower side of the fuel tank 18 and a cowling 19 covers the engine and the body frame 13. The engine and the cowling 19 are fitted to the body frame 13.

Figure 2:
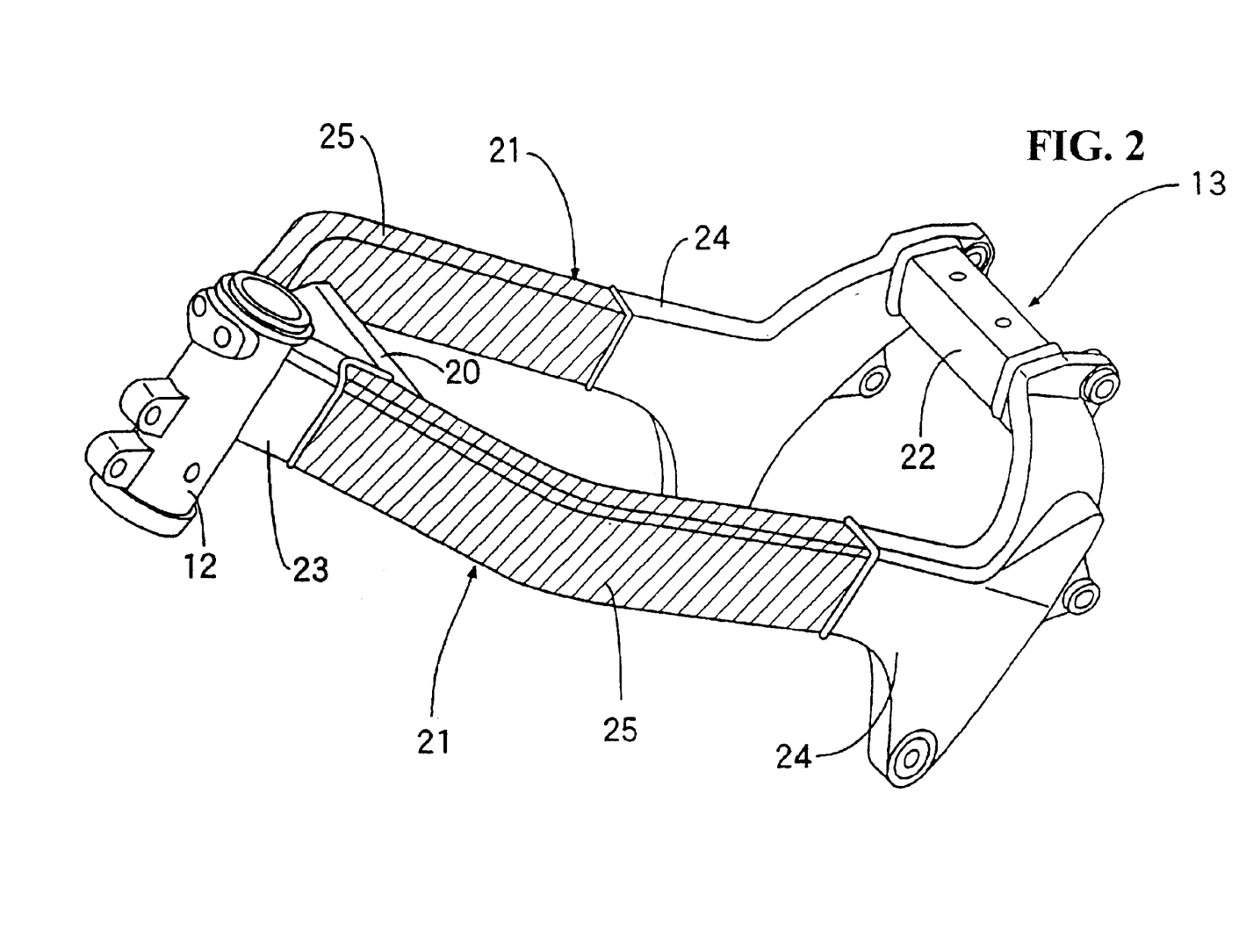
FIG. 2 is a perspective view of a body frame.

As shown in FIG. 2, the body frame 13 includes the head pipe 12. A left-right pair of main frames 21 is connected to the head pipe 12 through a gusset stay 20. The left-right pair of main frames 21 extends rearwardly downward. Furthermore, a cross member 22 connects the rear ends of the main frames 21.

The main frame 21 has a structure in which a main frame front portion 23 and a main frame rear portion 24 are connected by welding through a hollow pipe 25. The main frame front portion 23 includes the head pipe 12 integrally formed by die-casting. The main frame rear portion 24 includes the cross member 22 integrally formed by die-casting. The hollow pipe 25 (the hatched portion) has a tubular form with a tetragonal cross-sectional shape. Furthermore, the hollow pipe 25 is formed by extrusion of a light alloy, for example, an aluminum alloy.

Figure 3:
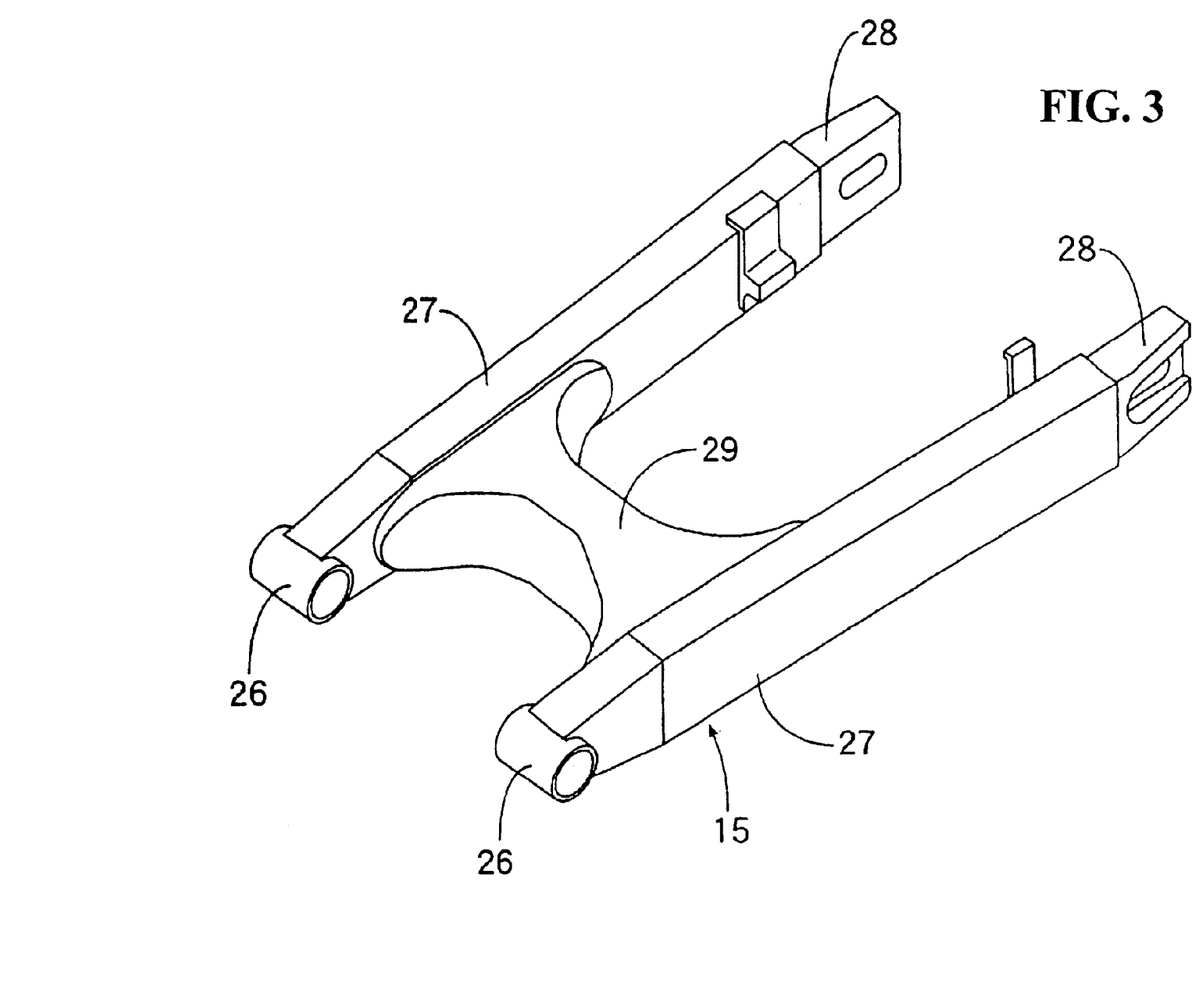
FIG. 3 is a perspective view of a rear fork.
Figure 4:
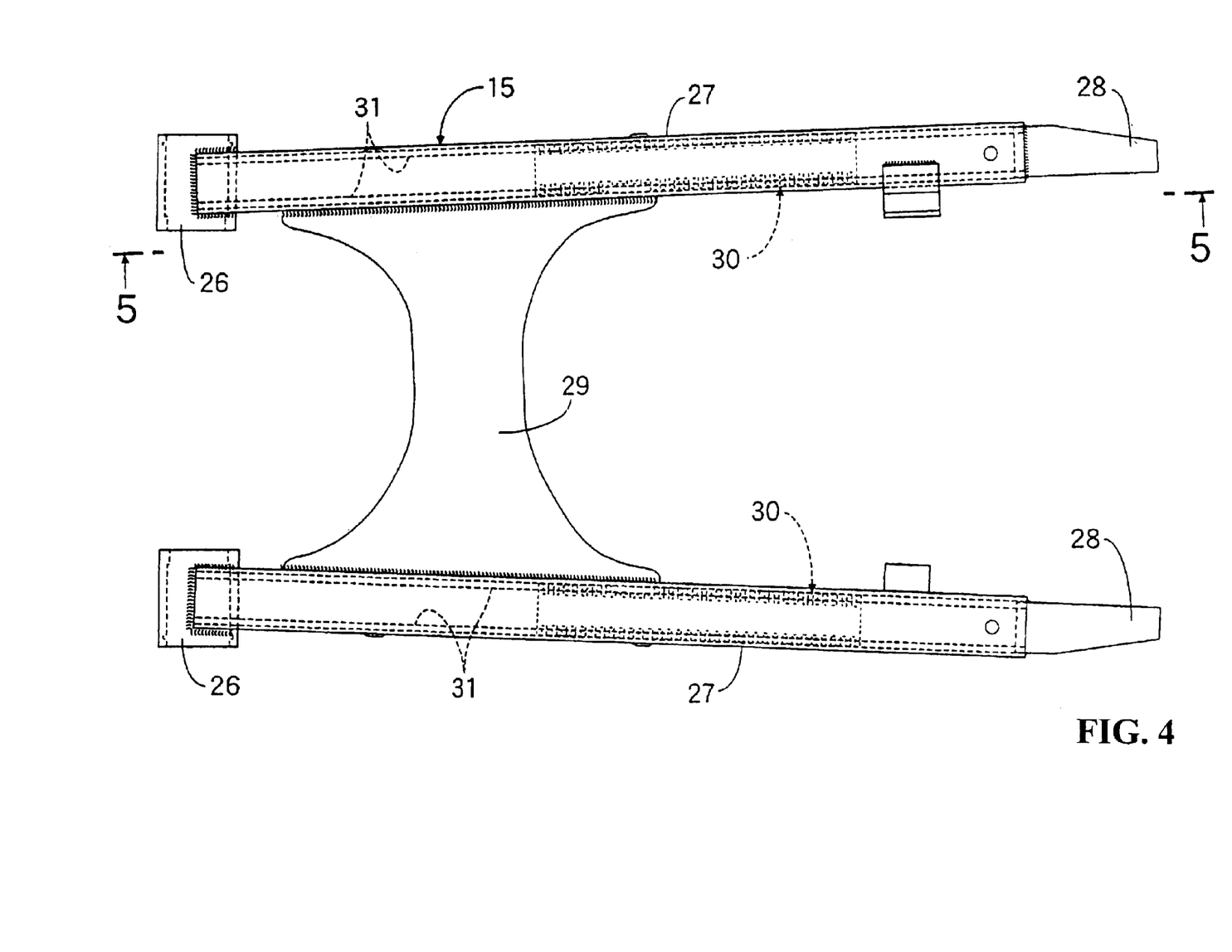
FIG. 4 is a plan view of the rear fork.
Figure 5:
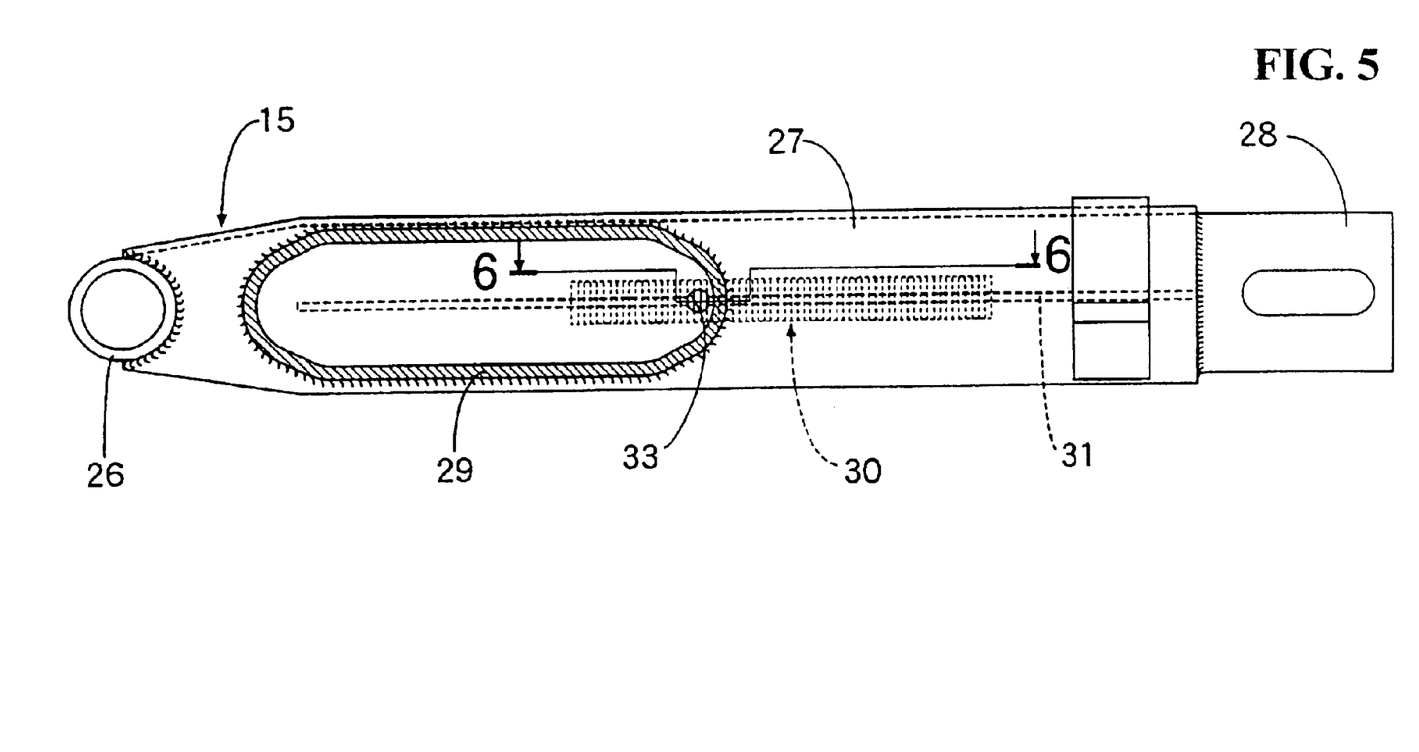
FIG. 5 is a sectional view taken along line 5—5 of FIG. 4.

As shown in FIGS. 3 to 5, the rear fork 15 includes a left-right pair of bearing cylinders 26 supported by the pivotal shaft 14. A left-right pair of hollow pipes 27 is connected to the bearing cylinders 26 and extends rearwards. Bearing members 28 are welded to the rear ends of the hollow pipes 27 to close the rear ends of the hollow pipes 27. Furthermore, a cross member 29 connects the portions of the hollow pipes 27 near the bearing cylinders 26. In addition, the hollow pipes 27 are formed by extrusion of a light alloy, for example, an aluminum alloy.

Figure 6:
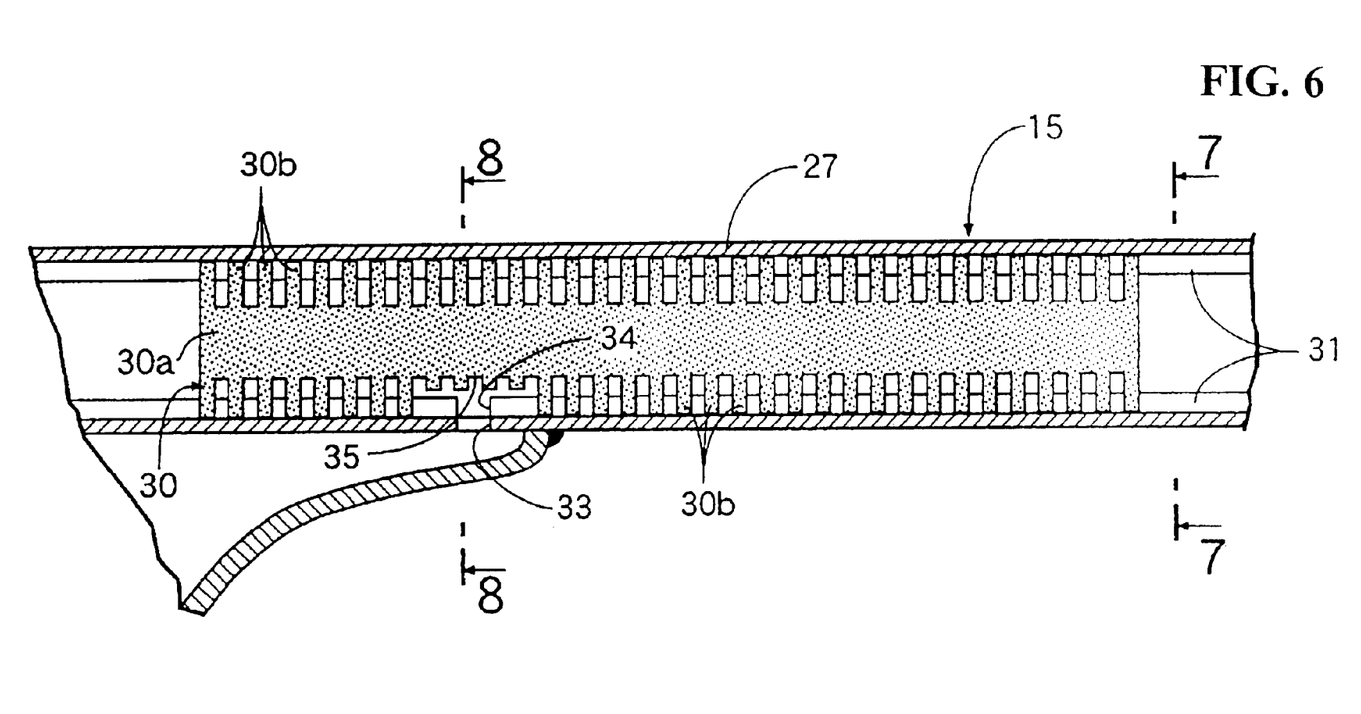
FIG. 6 is an enlarged view taken along line 6—6 of FIG. 5.
Figure 7:
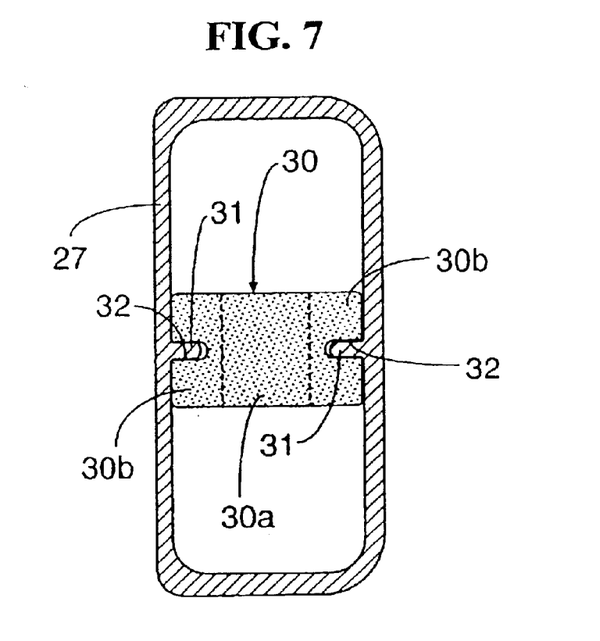
FIG. 7 is a sectional view taken along line 7—7 of FIG. 6.
Figure 8:
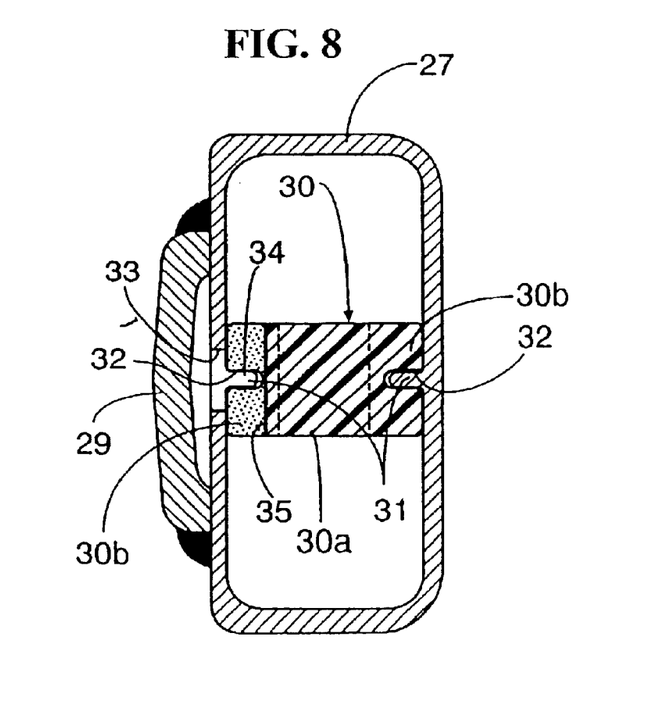
FIG. 8 is a sectional view taken along line 8—8 of FIG. 6.

Referring also to FIGS. 6 and 8, a vibration-proofing member 30 for restraining vibration of the hollow pipe 27, namely, of the rear fork 15 is inserted in the hollow pipe 27. Ribs 31 for holding the position of the vibration-proofing member 30 in the hollow pipe 27 are integrally projected on both inside surfaces of the hollow pipe 27. The ribs extend along the longitudinal direction of the hollow pipe 27.

On the other hand, the vibration-proofing member 30 is formed of an elastic material such as rubber, and is comprised of a polygonal columnar form vibration-proofing member main portion 30a extending along the longitudinal direction of the hollow pipe 27. The vibration-proofing member 30 has a tetragonal cross-sectional shape. Furthermore, engaging portions 30b integrally project in a plurality of locations from both side surfaces of the vibration-proofing member main portion 30a. The engaging portions 30b face toward both inside surfaces of the hollow pipe 27.

The engaging portions 30b are each roughly U-shaped while having a groove 32 for elastic engagement with the rib 31 at a central portion thereof. Furthermore, the engaging portions 30b are integral with the vibration-proofing member 30 at a plurality of locations spaced along the longitudinal direction of the rib 31.

When the bearing member 28 is not connected to the rear end of the hollow pipe 27, the vibration-proofing member 30 is inserted into the hollow pipe 27 to a predetermined position through a rear end opening portion of the hollow pipe 27.

Depending on the insertion position of the vibration-proofing member 30 into the hollow pipe 27, a through-hole 33 as shown in FIGS. 6 and 8 may be provided in a side wall of the hollow pipe 27 at a position corresponding to an intermediate portion of the rib 31. In that case, in order to prevent the through-hole 33 from being closed with the rib 31 and the vibration-proofing member 30, a cutout portion 34 corresponding to the through-hole 33 may be provided at an intermediate portion of the rib 31. Furthermore, the vibration-proofing member 30 may be provided with a cutout portion 35 formed by cutting off a part of the engaging portions 30b.

By the fitting of such a vibration-proofing member 30 to the hollow pipe 27, the high resonance frequency peculiar to the aluminum alloy constituting the hollow pipe 27 can be suppressed. Therefore, vibration of the rear fork 15 attendant on oscillation from the engine and the front and rear wheels WF and WR can be restrained, thereby contributing to a reduction in vibration noise.

In addition, the inside of the hollow pipe 25 (See FIG. 2) constituting a part of the main frame 21 is also constructed in the same manner as the inside of the hollow pipe 27 of the rear fork 15. Accordingly, vibration of the main frame 21 attendant on oscillation from the engine and the front and rear wheels WF and WR can be restrained, thereby contributing to a reduction in vibration noise.

The operation of this embodiment will now be described. The hollow pipe 27 constituting at least a part (in this embodiment, a part) of the rear fork 15 is formed by extrusion of a light alloy such as an aluminum alloy. The vibration-proofing member 30 for restraining vibration of the hollow pipe 27 is inserted in the hollow pipe 27, so that the appearance of the hollow pipe 27 and hence the rear fork 15 is not impaired.

In addition, the hollow pipe 27 is integrally provided on it's inside surface with the ribs 31 extending along the longitudinal direction of the hollow pipe 27. The ribs 31 hold the position of the vibration-proofing member 30 in the hollow pipe 27 in the direction orthogonal to the longitudinal direction. Therefore, component parts other than the hollow pipe 27 are not necessary in fitting the vibration-proofing member 30 into the hollow pipe 27. Accordingly, the number of component parts is not increased.

Moreover, the rib 31 extends in the longitudinal direction of the hollow pipe 27, which is formed by extrusion of a light alloy. Therefore, the rib 31 can be formed simultaneously with the extrusion of the hollow pipe 27. Furthermore, the rib 31 will not act as an obstacle at the time of insertion of the vibration-proofing member 30 into the hollow pipe 27.

In addition, the vibration-proofing member 30 is formed of an elastic material such as rubber, and the vibration-proofing member 30 is provided with the groove 32 for elastic engagement with the rib 31. Therefore, the vibration-proofing member 30 can be held in the hollow pipe 27 more securely while maintaining the position of the vibration-proofing member 30 in the direction along the longitudinal direction of the hollow pipe 27 by a frictional force arising from the elastic engagement of the groove 32 with the rib 31.

Furthermore, the vibration-proofing member 30 is provided with the plurality of engaging portions 30b for engagement with the rib 31 at intervals along the longitudinal direction of the rib 31. At the time of insertion of the vibration-proofing member 30 into the hollow pipe 27, a plurality of portions of the vibration-proofing member 30 spaced along the longitudinal direction make sliding contact with the hollow pipe 27. Accordingly, the frictional resistance at the time of inserting the vibration-proofing member 30 can be suppressed to be comparatively low, and the inserting operation can be facilitated.

In addition, at least a part of the main frame 21 is constituted of the hollow pipe 25. Furthermore, the vibration-proofing member 30 is inserted into and held in the hollow pipe 25, with the same structure as in the hollow pipe 27 of the rear fork 15. Therefore, the same effects as those in the hollow pipe 27 of the rear fork 15 can be accomplished in the hollow pipe 25 of the main frame 21.

As described above, according to the first aspect of the present invention, fitting of the vibration-proofing member can be performed without impairing the appearance of the hollow pipe and without increasing the number of component parts. In addition, the rib can be formed simultaneously with the extrusion of the hollow pipe. Accordingly, the rib does not act as an obstacle at the time of inserting the vibration-proofing member into the hollow pipe.

In addition, according to the second aspect of the present invention, the vibration-proofing member can be held in the hollow pipe more securely while maintaining the position of the vibration-proofing member in the direction along the longitudinal direction of the hollow pipe by a frictional force arising from the elastic engagement of the groove with the rib.

According to the third aspect of the present invention, the frictional resistance at the time of inserting the vibration-proofing member can be suppressed to be comparatively low. Furthermore, the inserting operation can be facilitated.

According to the fourth and fifth aspects of the present invention, the effect of any of the first through third aspects of the present invention can be accomplished by constructing the vibration-proofing structure for the rear fork or the main frame, respectively.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vibration-proofing structure for a hollow pipe for a vehicle, comprising:
 a hollow pipe for a vehicle, said hollow pipe being formed by extrusion of a light alloy and being integrally provided on an inside surface thereof with a rib extending along a longitudinal direction of said hollow pipe; and
 a vibration-proofing member for restraining vibration of said hollow pipe, said vibration-proofing member being inserted in said hollow pine so that a position of said vibration-proofing member in said hollow pipe in a direction orthogonal to the longitudinal direction is held by said rib,
 wherein said vibration-proofing member is provided with a plurality of engaging portions for engagement with said rib at intervals along the longitudinal direction of said rib.

2. The vibration-proofing structure for a hollow pipe for a vehicle according to claim 1, wherein said vibration-proofing member is formed of an elastic material and is provided with a groove for elastic engagement with said rib.

3. The vibration-proofing structure for a hollow pipe for a vehicle according to claim 1, wherein said hollow pipe forms at least a part of a rear fork of a motorcycle.

4. The vibration-proofing structure for a hollow pipe for a vehicle according to claim 1, wherein said hollow pipe forms at least a part of a main frame of a motorcycle.

5. A vibration-proofing structure for a hollow pipe for a vehicle, comprising:
 a hollow pipe for a vehicle, said hollow pipe being formed by extrusion of a light alloy and being integrally provided on an inside surface thereof with a rib extending along a longitudinal direction of said hollow pipe; and
 a vibration-proofing member for restraining vibration of said hollow pipe, said vibration-proofing member being inserted in said hollow pipe so that a position of said vibration-proofing member in said hollow pipe in a direction orthogonal to the longitudinal direction is held by said rib,
 wherein said hollow pipe forms at least a part of a rear fork of a motorcycle.

6. The vibration-proofing structure for a hollow pipe for a vehicle according to claim 5, wherein said vibration-proofing member is formed of an elastic material and is provided with a groove for elastic engagement with said rib.

7. A vibration-proofing structure for a hollow pipe for a vehicle, comprising:
 a hollow pipe for a vehicle, said hollow pipe being formed by extrusion of a light alloy and being integrally provided on an inside surface thereof with a rib extending along a longitudinal direction of said hollow pipe: and
 a vibration-proofing member for restraining vibration of said hollow pipe, said vibration-proofing member being inserted in said hollow pipe so that a position of said vibration-proofing member in said hollow pipe in a direction orthogonal to the longitudinal direction is held by said rib,
 wherein said hollow pipe forms at least a part of a main frame of a motorcycle.

8. The vibration-proofing structure for a hollow pipe for a vehicle according to claim 7, wherein said vibration-proofing member is formed of an elastic material and is provided with a groove for elastic engagement with said rib.

9. A motorcycle, comprising:
 a main frame, said main frame including a main frame front portion and a main frame rear portion;
 a front fork, said front fork being rotatably supported by said main frame front portion and supporting a front wheel;
 a rear fork, said rear fork being vertically swingably supported by said main frame rear portion and supporting a rear wheel; and
 a vibration-proofing member, said vibration-proofing member forming at least a part of at least one of said main frame and said rear fork and comprising:
  a hollow pipe, said hollow pipe being formed by extrusion of a light alloy and being integrally provided on an inside surface thereof with a rib extending along a longitudinal direction of said hollow pipe; and
  a vibration-proofing member for restraining vibration of said hollow pipe, said vibration-proofing member being inserted in said hollow pipe so that a position of said vibration-proofing member in said hollow pipe in a direction orthogonal to the longitudinal direction is held by said rib.

10. The motorcycle according to claim 9, wherein said vibration-proofing member is formed of an elastic material and is provided with a groove for elastic engagement with said rib.

11. The motorcycle according to claim 10, wherein said vibration-proofing member is provided with a plurality of engaging portions for engagement with said rib at intervals along the longitudinal direction of said rib.

12. The motorcycle according to claim 10, wherein said hollow pipe forms at least a part of said rear fork.

13. The motorcycle according to claim 10, wherein said hollow pipe forms at least a part of said main frame.

14. The motorcycle according to claim 9, wherein said vibration-proofing member is provided with a plurality of engaging portions for engagement with said rib at intervals along the longitudinal direction of said rib.

15. The motorcycle according to claim 14, wherein said hollow pipe forms at least a part of said rear fork.

16. The motorcycle according to claim 14, wherein said hollow pipe forms at least a part of said main frame.

17. The motorcycle according to claim 9, wherein said hollow pipe forms at least a part of said rear fork.

18. The motorcycle according to claim 9, wherein said hollow pipe forms at least a part of said main frame.

* * * * *